(12) United States Patent
Sundar et al.

(10) Patent No.: US 9,356,879 B2
(45) Date of Patent: May 31, 2016

(54) OPTIMIZED PATH MAXIMUM TRANSMISSION UNIT DISCOVERY

(71) Applicant: DELL PRODUCTS L.P., Round Rock, TX (US)

(72) Inventors: Chandra Mohan Sundar, Tamilnadu (IN); Pugalendran Rajendran, Mettupalayam (IN)

(73) Assignee: DELL PRODUCTS L.P., Round Rock, TX (US)

( * ) Notice: Subject to any disclaimer, the term of this patent is extended or adjusted under 35 U.S.C. 154(b) by 60 days.

(21) Appl. No.: 14/285,512

(22) Filed: May 22, 2014

(65) Prior Publication Data
US 2015/0341278 A1 Nov. 26, 2015

(51) Int. Cl.
| | | |
|---|---|---|
| H04J 1/16 | (2006.01) | |
| H04L 12/28 | (2006.01) | |
| H04J 3/18 | (2006.01) | |
| H04L 12/805 | (2013.01) | |
| H04L 12/741 | (2013.01) | |
| H04L 29/06 | (2006.01) | |
| H04W 28/20 | (2009.01) | |

(52) U.S. Cl.
CPC ............. *H04L 47/365* (2013.01); *H04L 29/06* (2013.01); *H04L 45/74* (2013.01); *H04L 69/22* (2013.01); *H04W 28/20* (2013.01)

(58) Field of Classification Search
CPC ..... H04L 47/10; H04L 69/166; H04L 47/365; H04L 47/36
See application file for complete search history.

(56) References Cited

U.S. PATENT DOCUMENTS

| | | | | |
|---|---|---|---|---|
| 5,959,974 | A * | 9/1999 | Badt | H04L 29/06 370/233 |
| 2002/0071436 | A1* | 6/2002 | Border | H04B 7/18582 370/395.32 |
| 2005/0025185 | A1* | 2/2005 | Brown | H04L 29/06 370/474 |
| 2005/0281288 | A1* | 12/2005 | Banerjee | H04L 47/10 370/477 |
| 2010/0322249 | A1* | 12/2010 | Thathapudi | H04L 47/10 370/395.1 |
| 2011/0243138 | A1* | 10/2011 | Oh | H04L 69/16 370/392 |
| 2013/0329739 | A1* | 12/2013 | Briscoe | H04L 43/028 370/392 |
| 2015/0071067 | A1* | 3/2015 | Martin | G06F 11/2002 370/235 |

OTHER PUBLICATIONS

B. Briscoe, "Reusing the IPv4 identification field in atomic packets draft-priscoe-tntarea-ipv4-id-reuse-02," printed from: http://tools.ietf.org/id/draft-briscoe-intarea-ipv4-id-reuse-02.txt, Oct. 20, 2012 (29pgs).
J. Mogul and S. Deering, Stanford University, Nov. 1990, "Path MTU Discovery," printed from http://tools.ietf.org/html/rfc1191 (19pgs).

* cited by examiner

*Primary Examiner* — Melanie Jagannathan
(74) *Attorney, Agent, or Firm* — North Weber & Baugh LLP (57) ABSTRACT

Embodiments of the present invention provide path MTU discovery of a network path, such as an IPv4 network. According to various embodiments of the invention, a node receives a packet at a node along the network path between a source node and a destination node, compares a MTU size of a next hop along the network path with the size of the packet, responsive to the MTU size of the next hop along the network path being less than the size of the packet, a DF flag being set to not allow fragmentation, a RC flag being set to identify that a portion of the packet is reserved for PMTU size, and a PMTU bit being set to positive, truncates the packet to the MTU size of the next hop, stores the MTU size in the portion of the packet reserved for PMTU size, and forwards the packet.

17 Claims, 5 Drawing Sheets

OPTIMIZED PATH MAXIMUM TRANSMISSION UNIT DISCOVERY

BACKGROUND

1. Field of Invention

The present invention relates generally to data communication networks and devices, and relates more particularly to the discovery of a maximum transmission unit (MTU) size in a network path of a data communication network.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a data communication network, when one Internet Protocol (IP) host has a large amount of data to send to another host, the data is transmitted as a series of IP datagrams or packets. It is often preferable that these datagrams be of a largest size that does not require fragmentation anywhere along the path from the source to the destination. This datagram size may be referred to as the maximum transmission unit (MTU) for the path and may be referred to as the path MTU or PMTU. The PMTU thus is the minimum of the MTUs of each hop in the path.

Conventional techniques for path MTU discovery may involve first setting the "do not fragment" (DF) flag on a packet sent by a source node. If a router has a communication interface with a next hop MTU size smaller than the packet size, an Internet Control Message Protocol (ICMP) error message is returned along with the smaller next hop MTU size and the packet is dropped. Upon receiving the ICMP error message, the source node may resend a smaller packet according to the MTU size recorded in the ICMP error message. The resending process may be repeated until the packet is received by the intended destination node. Upon receiving the packet, the destination node may send an acknowledgement message to confirm the MTU of the path. On a path with a plurality of nodes and various MTU sizes, multiple rounds of packet transmission may be necessary to determine the path MTU. Thus the conventional techniques for path MTU discovery are inefficient.

Accordingly, there is need for an optimized path MTU discovery system and method to reduce the number of packets and the effective time in determining the MTU of a path.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

In the following description, for purposes of explanation, specific examples and details are set forth in order to provide an understanding of the invention. It will be apparent, however, to one skilled in the art that the invention may be practiced without these details. Well-known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including some steps being done concurrently.

The terms "datagram," "packet," or "frame" shall be understood to mean a group of bits that can be transported across a network. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall also be noted that although embodiments described herein may be within the context of Internet Protocol, the invention elements of the current patent document are not so limited. Accordingly, the invention elements may be applied or adapted for use in other contexts.

Networks often include one or more computing devices that facilitate the passage of information between the computer systems and devices. A network node may be a network device or computer or specialized device connected by the communication links. End node such as a source node and/or a destination node may be a network node that is configured to originate or terminate communications over the network. An intermediate network node facilitates the passage of data between end nodes.

Communications between nodes are typically effected by exchanging packets of data. Information is exchanged within data packets according to one or more protocols. A protocol consists of a set of rules defining how the nodes interact with each other based on information sent over the communication links. Each packet typically comprises a header portion associated with a particular protocol, and a payload (data) portion that follows the header information and includes information that may be processed independently of that particular protocol. The header may include information such as the source of the packet, its destination, the length of the payload, and other properties used by the protocol. Often, the data in the payload for the particular protocol includes a header and payload for a different protocol associated with a different layer of detail for information exchange.

The header may provide information defining the source and destination address within the network. Notably, the path may span multiple communication links. The header may be formatted according to the Internet Protocol (IP), which specifies IP addresses of both a source and destination node at the end points of the network path. Thus, the packet may "hop" from node to node along its network path until it reaches the end node assigned to the destination IP address stored in the packet's internetwork header. And intermediate network nodes including routers and switches may be placed along the network path to determine which next hop communication link or links to employ in order to facilitate the progress of data packets through the network.

Figure 1:
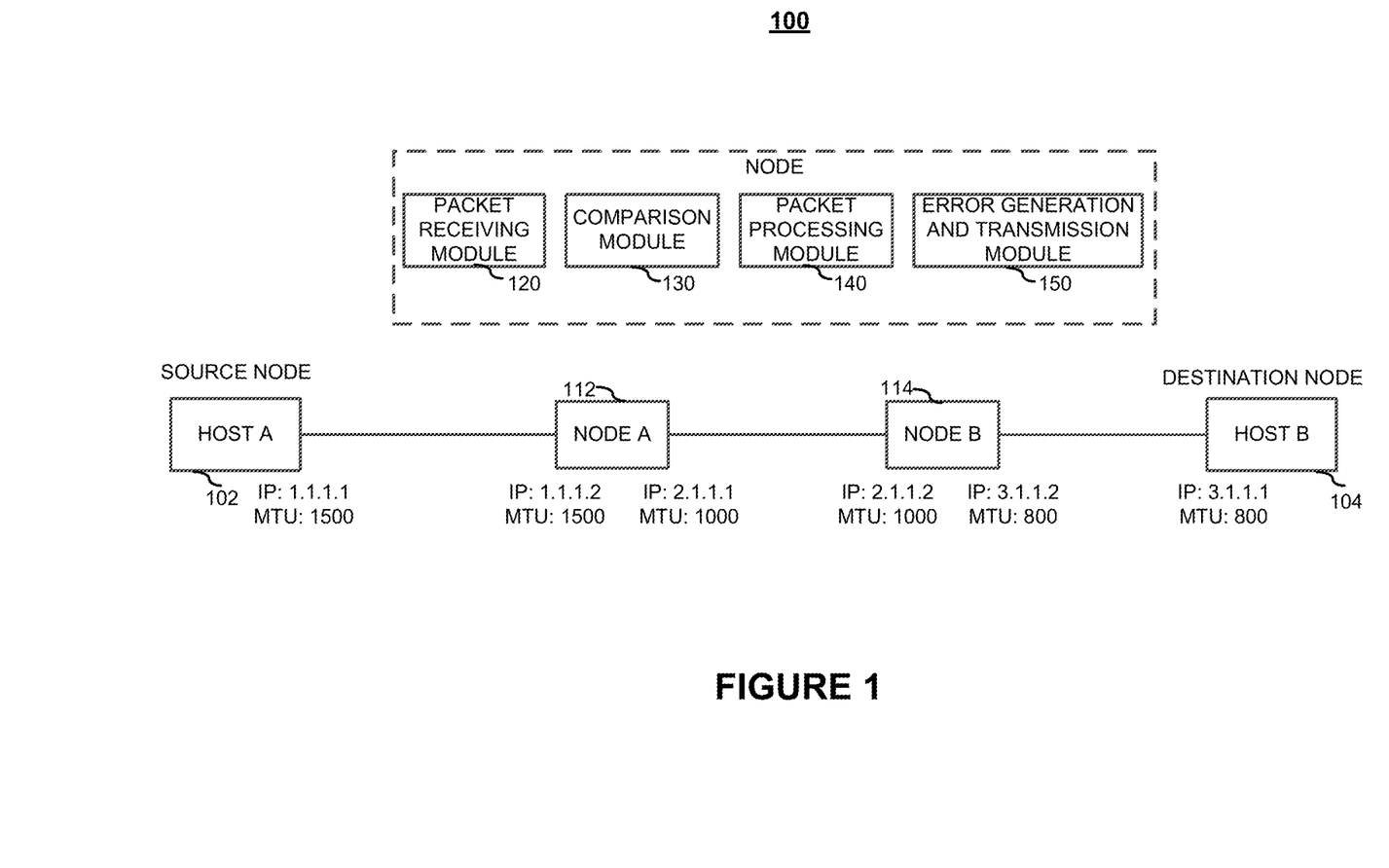
FIG. 1 depicts a portion of a network in which an optimized path maximum transmission unit discovery system may be implemented according to embodiments of the present invention.

FIG. 1 is an illustration of a network 100 of nodes operatively connected by a plurality of network connections. In network 100, a source node host A 102, communicatively coupled to at least one intermediate node via at least one network connection, may transmit data to a destination node host B 104 via a network path. Each node in network 100 may have at least one communication interface to receive and/or transmit packets. One skilled in the art will recognize, however, that the terms "source node" and "destination node" are understood to be relative to the roles played by two networked computing devices in a data transmission. A computing device used as a node in a network that is transmitting data to another networked computing device may be considered a source node for that data transmission; conversely, a computing device in a network that is receiving data from another networked computing device may be considered a destination node for that data transmission. In a different data transmission, the role played by a computing device may change.

The intermediate nodes, such as node A 112 and node B 114 may be computing devices for interconnecting network components that use the same transmission protocol to receive and/or transmit data. In some embodiments, node A 112 and node B 114 are routers interconnecting Internet Protocol version 4 (IPv4) network components to form a network path. Along the network path, node A 112, communicatively coupled to the source node host A 102 and another intermediate node B 114, may receive data from the source node host A 102 and transmit the data to node B 114. And along the network path, node B 114, communicatively coupled to the destination node host B 104 and another intermediate node A 112, may receive data from the node A 112 and transmit the data to the destination node host B 104.

To perform path maximum transmission unit (MTU) discovery of network 100, in some embodiments, each node in network 100 may comprise a packet receiving module 120, a comparison module 130, a packet processing module 140, and an error generation and transmission module 150, among others. During a path MTU discovery, a packet may be received by the packet receiving module 120. The size of the packet may then be compared with the MTU size of a next hop by the comparison module 130. After the comparison, in case the MTU size of the next hop is less than the size of the packet and the packet has a "do not fragment" (DF) flag in the packet header set to 1 indicating not to allow fragmentation, the packet processing module 140 may take actions before forward the packet to the next hop and/or the destination node. The actions taken by the packet processing module 140 are further illustrated in FIGS. 2-4. In case any error occurred during the path MTU discovery process, the error generation and transmission module 150 may generate and transmit an error message to the source node.

As used herein, "next hop" is a communication interface through which the data is transmitted on a computing device. MTU settings of next hop may appear in association with the communication interface (NIC, serial port, etc.) of the computing device. For example, in FIG. 1, when transmitting from the source node host A 102 to the destination node host B 104, the source node host A 102 has a communication interface with an IP address of 1.1.1.1. The MTU of next hop from host A 102 is 1500. On node A 112, one communication interface with an IP address 1.1.1.2 may be used to receive data from the source node host A 102, and another communication interface with an IP address 2.1.1.1 may be used to forward data to a next computing device. Thus, on node A 112, the MTU size of the interface associated with IP address 1.1.1.2 may be 1500, and the MTU size of the interface associated with IP address 2.1.1.1 may be 1000. Similarly, on node B 114, the MTU size of the interface associated with IP address 2.1.1.2 may be 1000, and the MTU size of the interface associated with IP address 3.1.1.2 may be 800. And, on the destination node host B 104, the MTU size of the destination interface associated with the IP address 3.1.1.1 is 800.

For each combination of source and destination nodes, a path MTU represents the largest packet size allowable on the network path taken from the sending host to the destination host. This datagram size may be referred to as the MTU for the path and may be referred to as the path MTU or PMTU. The PMTU size thus is the minimum of the MTU sizes of all hops in the network path. In FIG. 1, the PMTU size between the source node host A 102 and the destination node host B 104 is 800, since the minimum MTU on the network path from the source node host A 102 and the destination node host B 104 is 800, which occurs at node B 114 communication interface IP address 3.1.1.2.

Figure 2:
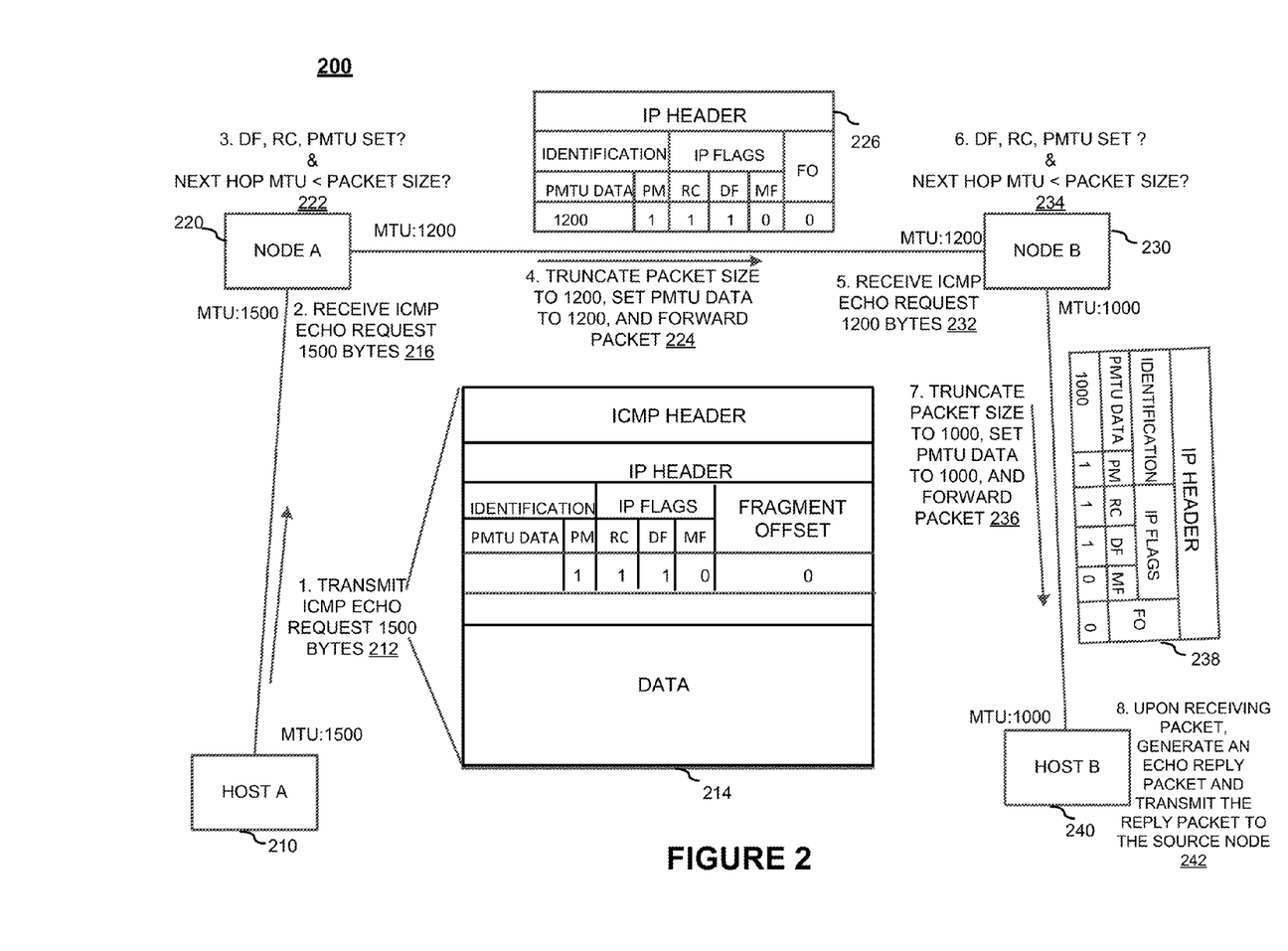
FIG. 2 depicts an example system performing a path maximum transmission unit discovery according to embodiments of the present invention.
Figure 3:
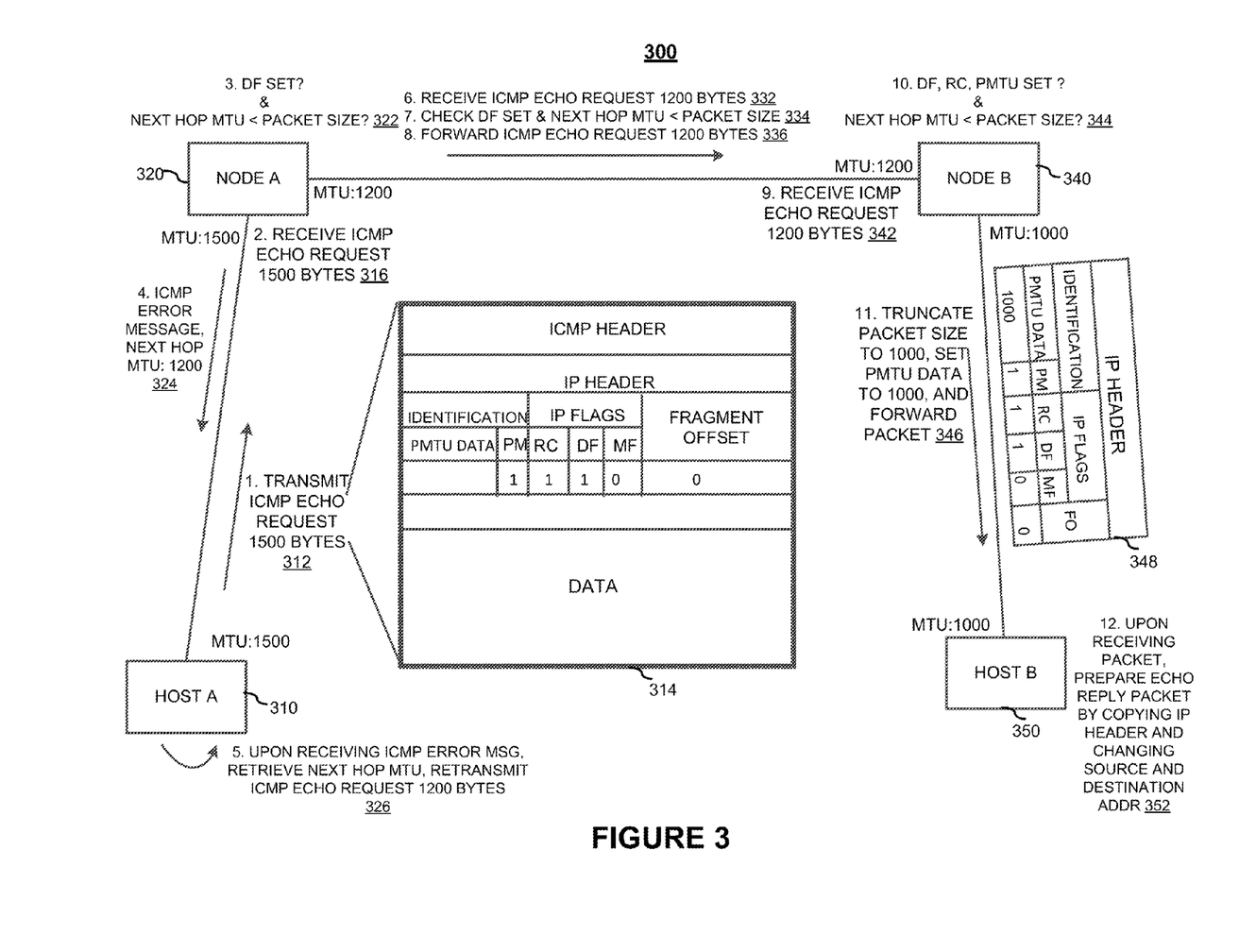
FIG. 3 depicts another example system performing a path maximum transmission unit discovery according to embodiments of the present invention.

The system 100 as illustrated in FIG. 1 may reduce the number of packets and the effective time in determining the MTU size of a network path according to embodiments of the present invention. An example system according to embodiments of the present invention to optimize path MTU discovery is illustrated in FIG. 2. In addition to conserving system resource, the system 100 also allows backward compatibility. FIG. 3 illustrates the backward compatibility aspect in another example system according to embodiments of the present invention.

FIG. 2 depicts an example system 200 performing a path MTU discovery according to embodiments of the present invention. In some embodiment, a packet used for path MTU discovery is an ICMP echo request packet of IPv4. A portion of the example ICMP echo request packet used in the optimized path MTU discovery is illustrated in FIG. 2, denoted as 214. Though FIG. 2 illustrates the optimized path MTU discovery using an ICMP echo request packet of IPv4, aspects of the present invention may be used or adapted for use in other contexts.

The portion of an example ICMP echo request packet 214 has an ICMP header portion, an IPv4 header portion, and a data portion. The IPv4 header portion may include the following fields: an Identification (ID), an IP flag, and a fragment offset, among others. Within the IP flag field, the header may further include Recycled flag (RC) indicating the ID field may be used for path MTU discovery according to some embodiments and a More Fragment field flag (MF). Traditionally the ID field of IPv4 is used to identify different parts of packets that have been split into various fragments. IPv4 path MTU discovery process may use atomic packets where DF bit is set to 1 and MF is set to 0 and the fragment offset is 0. Since atomic packets, namely unfragmented and indivisible packets, are used in path MTU discovery, the 16 bits of the ID field are redundant and may be used for other purposes, such as for optimized path MTU discovery.

To utilize the ID field for optimized path MTU discovery, in some embodiments, a control flag within the IP flag field is defined as RC flag and the RC flag is set to 1 in an atomic packet to flag that the ID field is not to be interpreted as identifiers for reassembly of fragmented packet. In such an atomic packet, according to embodiments of the present invention, one bit may be designated as a PMTU bit (shown as PM in 214 of FIG. 2) within the ID field. In embodiments, the PMTU bit identifies that the packet can be used for path MTU discovery. In embodiments, bits in the ID field may be reserved to store the PMTU size value. For packets, which have the PMTU bit set to a positive value, such as 1, the portion of the packet reserved for storing PMTU size is referred as PMTU data, as illustrated in 214 of FIG. 2.

In addition to the IPv4 header, the ICMP echo request packet of IPv4 214 has an 8-byte ICMP header. Though not shown in FIG. 2, the first 4 bytes of the ICMP header include a 1-byte type field, a 1-byte code field, and a 2-byte checksum field. An ICMP echo request packet of size 1500 with the type field set to 8 and the code field set to 0 may indicate the packet is an ICMP echo request transmitted for path MTU discovery. Conventional path MTU discovery may also reserve 2-byte of the remaining 4-byte of the ICMP header for the next hop MTU size.

During a conventional path MTU discovery, once an intermediate node determines that a packet size is larger than a MTU size of next hop and the packet has DF set to 1 indicating not allow fragmentation, an ICMP error message may be generated with the type field set to 3 indicating destination unreachable and code field set to 4 indicating fragmentation required and DF flag set. In the ICMP error message, the next hope MTU size may also be stored in the 2-byte field of the ICMP header. Upon receiving the ICMP error message, a source node may extract the next hop MTU size from the ICMP header, prepare a smaller packet size ICMP echo request according to the next hop MTU size, and restart the conventional path MTU discovery process.

Relative to the inefficient conventional path MTU discovery method, the optimized path MTU discovery according to embodiments of the present invention performs path MTU discovery without relying on several rounds of ICMP error message transmission. The first step of the optimized path MTU discovery, denoted as 212, is to transmit a packet from the source node host A 210. The communication interface on the source node host A 210, where the packet is transmitted from, may have an MTU size of 1500. In FIG. 2, the packet transmitted for path MTU discovery is an ICMP echo request packet with a packet size of 1500 bytes, PMTU bit (PM) set to 1, RC flag set to 1, DF flag set to 1, and MF flag set to 0.

In step 2, 216, the packet transmitted by the source node host A 210 may be received by node A 220, communicatively coupled to the source node host A 210 and node B 230. Node A 220 may receive the packet via a communication interface with an MTU size of 1500. After receiving the packet, node A 220 may identify the settings of DF flag, RC flag, and PMTU bit, and compare the MTU size of the next hop with the size of the packet in step 3, 222. Responsive to the MTU size of the next hop along the network path being less than the size of the packet, DF flag being set to 1 indicating not allow fragmentation, RC flag being set to 1 indicating that a portion of the packet is reserved for PMTU size and that the ID field is not the conventional usage, and PMTU bit being set to 1, node A 220 may truncate the packet to size 1200, set PMTU data to 1200 and forward the packet to the next hop in step 4, 224. The packet may be forwarded via a communication interface on node A 220 with a next hop MTU size of 1200. A portion of the packet header forwarded by node A 220 is illustrated in FIG. 2 denoted as 226. The portion of the packet header 226 has DF flag being set to 1, RC flag being set to 1, PMTU bit being set to 1, and PMTU data being set to 1200.

Once the packet reaches another intermediate node, node B 230, step 5, 232, step 6, 234, and step 7, 236 may be performed similar to step 2, 216, step 3, 222, and step 4, 224 above. In step 5, 232, the packet may be received by node B 230 communicatively coupled to node A 220 and the destination node host B 240. Node B 230 may receive the message via a communication interface, which has an MTU size of 1200. In step 6, 234, node B 230 may identify the settings of DF flag, RC flag, and PMTU bit, and compare the MTU size of the next hop with size of the packet. Then in step 7, 236, responsive to the MTU size of the next hop along the network path being less than the size of the packet, DF flag being set to not allow fragmentation, RC flag being set to 1, and PMTU bit being set to 1, node B 230 may truncate the packet to size 1000, set the PMTU data to 1000, and forward the packet to the next hop. The packet forwarding may be performed via a communication interface of node B 230 with a next hop MTU size of 1000. A portion of the packet header forwarded by node A 220 is illustrated in FIG. 2 denoted as 238. The portion of the packet header 238 has DF flag being set to 1, RC flag being set to 1, PMTU bit being set to 1, and PMTU data being set to 1000.

The final step in the example optimized path MTU discovery is step 8, 242. In step 8, 242, when the packet reaches the destination node host B 240, the destination node host B 240 may generate a reply packet by copying the content of the packet and changing the source address and the destination address. The destination node host B 240 may then transmit the reply packet to the source node host A 210. The reply packet has a PMTU value of 1000 stored in PMTU data field. When the source node host A 210 receives the reply packet, it may examine PMTU bit and RC bit. And responsive to PMTU bit and RC bit being set, the source node host A 210 may retrieve the value in PMTU Data field as the MTU of the path.

As illustrated in FIG. 2, according to embodiments of present invention, the path MTU may be discovered with one round of ICMP echo request transmission and without the need to reply on several rounds of ICMP error message transmission for path MTU discovery. Atomic packets with size larger than the next hop MTU size are truncated and forwarded to the destination in one round of communication. Thus, the present invention discovers the path MTU with less number of packets transmitted, and the network resources are conserved. And with fewer rounds of packet transmission, the effective time in determining the path MTU is less. Therefore, relative to conventional path MTU discovery, the optimized path MTU discovery according to embodiments of the present invention is more efficient.

In addition, systems and methods according to embodiments of the present are backward compatible. Since the ID field of IPv4 traditionally is used for reassembly purpose of fragmented packets and the path MTU discovery uses atomic packets, the ID field is not used during the path MTU discovery process. The intermediate nodes, which recognize the significance of the RC bit and the PMTU bit, may operate according to the optimized method as illustrated in FIG. 2 by forwarding the message without sending back ICMP error messages. On the other hand, the intermediate nodes, which do not understand the significance of the RC bit and PMTU bit in the ID field may follow the conventional approach and originate an ICMP destination unreachable error message. The ICMP error message, in turn, may be processed by the source nodes according to the conventional approach, such as reducing the size of the packet and retransmitting the smaller sized packet for path MTU discovery. Thus, reusing the 16 bits of the ID field allows some nodes, which perform path MTU discovery using the optimized method, to operate with other nodes, which perform path MTU discovery according to conventional methods. The backward compatibility is further illustrated in FIG. 3 below.

FIG. 3 depicts an example system 300 performing a path MTU discovery according to embodiments of the present invention. Similar to the example system 200 illustrated in FIG. 2, in some embodiments, a packet transmitted for path MTU discovery is an ICMP echo request packet of IPv4. A portion of the example ICMP echo request packet is illustrated in FIG. 3, denoted as 314.

Similar to the example system 200 illustrated in FIG. 2, the path MTU discovery may begin with a source node host A 310 transmitting a packet of size 1500 in step 1, 312. The communication interface on the source node host A 310, where the packet is transmitted from, has an MTU size of 1500. Similar to the ICMP echo request packet 214 shown in FIG. 2, the ICMP echo request packet 314 is an atomic packet with DF bit being set to 1, MF being set to 0, the fragment offset being set to 0. The ICMP echo request packet 314 also sets the RC flag to 1 indicating that the ID field of IPv4 is not to be interpreted as ID for reassembly of fragmented packet. In addition, within the ID field of IPv4 header, the PMTU bit is set to a positive value, such as 1, and a portion of the packet reserved for storing PMTU size is referred as PMTU data. In step 2, 316, the packet transmitted by the source node A 310 may be received by node A 320, communicatively coupled to the source node host A 310 and node B 340. Node A 320 may receive the packet via a communication interface, which has an MTU size of 1500.

Different from system 200 illustrated in FIG. 2, in FIG. 3, node A 320 may be a node that is not configured to recognize this packet as supporting path MTU discovery according to embodiments of the present invention and thus uses conventional path MTU discovery method. After receiving the packet, node A 320 may identify the settings of DF flag and compare the MTU size of the next hop with the size of the packet in step 3, 322. Following conventional path MTU discovery methods, responsive to the MTU size of the next hop along the network path being less than the size of the packet, and DF flag being set to not allow fragmentation, node A 320 may transmit an ICMP error message to the source node host A 310 in step 4, 324. The ICMP error message may have the type field set to 3 indicating destination unreachable and code field set to 4 indicating fragmentation required and DF flag set. In addition, the ICMP error message may store the next hop MTU size of 1200 in the 2-byte field reserved in ICMP header. Upon receiving the ICMP error message, the source node host A 310 may retrieve the next hop MTU size from the ICMP header, prepare another ICMP echo request with smaller packet size of 1200, and restart the path MTU discovery process in step 5, 326. Once node A 320 receives the packet of size 1200 in step 6, 332, node A may identify that the packet size is less than the MTU size of next hop and DF bit being set to not allow fragmentation in step 7, 334, and forward the packet to node B 340 in step 8, 336.

Similar to node B 230 in FIG. 2, node B 340 in FIG. 3 is a node that, according to embodiments of the optimized path MTU discovery methods, may recognize the significance of RC flag and the PMTU bit in ID field of the IPv4 header, and may store the next hop MTU size in the PMTU data in the ID field of IP v4 header. Communicatively coupled to node A 320, node B 340 may receive packets forwarded by node A according to conventional approach, and process the packet according to the optimized path MTU discovery methods. As shown in FIG. 3, similar to step 5, 232 of FIG. 2, in step 9, 342, the packet forwarded by node A 320 may be received by node B 340 communicatively coupled to node A 320 and the destination node host B 350. Node B 340 may receive the packet via a communication interface, which has a next hop MTU size of 1200. Similar to step 6, 234 of FIG. 2, in step 10, 344, node B 340 may identify the settings of DF flag, RC flag, and PMTU bit, and compare the MTU size of the next hop with size of the packet. And similar to step 7, 236 of FIG. 2, in step 11, 346, responsive to the MTU size of the next hop along the network path being less than the size of the packet, DF flag being set to not allow fragmentation, RC flag being set to 1, and PMTU bit being set to 1, node B 340 may truncate the packet to size 1000, set the PMTU data to 1000, and forward the packet to the next hop. The packet may be forwarded via a communication interface on node B 340 with a next hop MTU size of 1000. A portion of the packet header forwarded by node A 320 is illustrated in FIG. 3 denoted as 348. The portion of the packet header 348 has DF flag being set to 1, RC flag being set to 1, PMTU bit being set to 1, and PMTU data being set to 1000.

The final step in the example path MTU discovery is step 12, 352. When the packet reaches the destination node host B 350, the destination node host B 350 may generate a reply packet by copying the packet and changing the source address and the destination address. The destination node host B 350 may then transmit the reply packet to the source node host A 310. The reply packet has PMTU value of 1000 stored in PMTU data field. When the source node host A 310 receives the reply packet, it may examine PMTU bit and RC bit. And responsive to PMTU bit and RC bit being set, the source node host A 310 may retrieve the value in PMTU Data field as the MTU of the path.

As shown in FIG. 3, the present invention is backward compatible with respect to intermediate devices that are not configured to support path MTU discovery according to embodiments of the present invention. With intermediate nodes such as node A 320 that is configured to only support conventional path MTU discovery approach and node B 340 that can support optimized path MTU discovery methods of the present invention and conventional MTU discover, the packet can reach the destination nodes to complete the path MTU discovery in fewer rounds of communication. Relative to system 200 of FIG. 2, system 300 incurs an extra round of communication before the packet reaches the destination node and the path MTU is discovered. However, relative to a conventional system, where both intermediate nodes drop the packet, rely on ICMP error message to record PMTU size, and cause three rounds of communication before completing the path MTU discovery, system 300 save a round of communication from node B 340. Thus, the overall system efficiency is improved. The optimized path MTU discovery method including the backward compatible aspect is further illustrated in FIG. 4.

Figure 4:
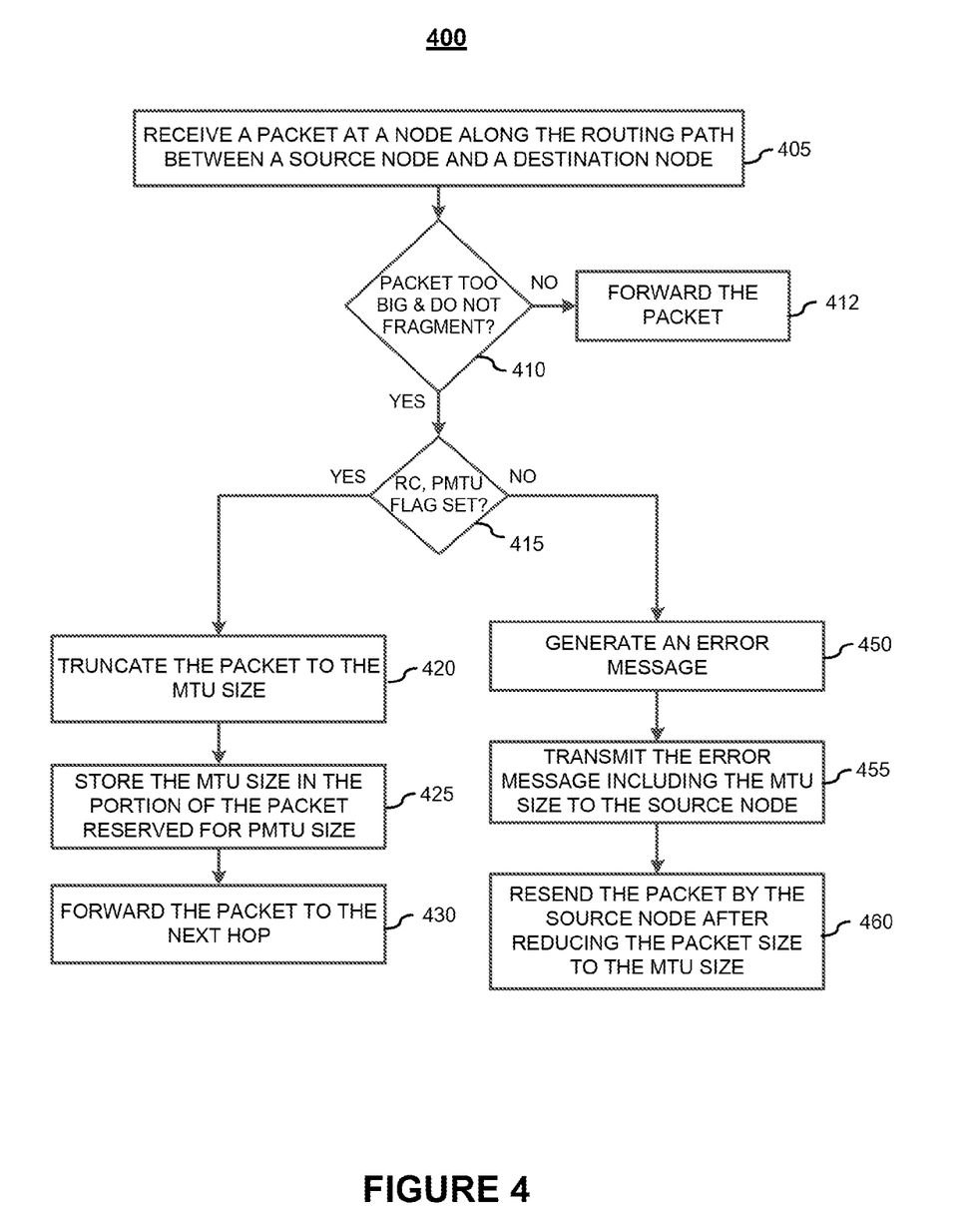
FIG. 4 is a flowchart illustrating an optimized method to discover a path maximum transmission unit according to embodiments of the present invention.

FIG. 4 is a flowchart illustrating an example method 400 executed on a node within a network to discover a path MTU according to embodiments of the present invention. Illustrated are operations 405-460 that are executed by, for example, the packet receiving module 120, the comparison module 130, the packet processing module 140, and the error generation and transmission module 150 residing on a node within network 100. An operation 405 is executed by the packet receiving module 120 to receive a packet at a node along the network path between a source node and a destination node. Following the operation 405, an operation 410 is executed by the comparison module 130 to compare a MTU size of a next hop along the network path with the size of the packet. The comparison is followed by operations 410 to 430 executed by the packet processing module 140. Among the operations executed by the packet processing module 140, a decisional operation 410 to identify the DF flag and the comparison result from the operation 410. Responsive to either the DF flag being set to not allow fragmentation or the MTU size of a next hop no less than the size of the packet, an operation 412 is executed to forward the packet. Responsive to the MTU size of the next hop along the network path being less than the size of the packet and identifying a DF flag being set to not allow fragmentation, a decision operation 415 is executed to identify the RC flag and the PMTU bit. Responsive to identifying a RC flag being set to identify that a portion of the packet is reserved for PMTU size, and a PMTU bit being set to positive, an operation 420 is executed to truncate the packet to the MTU size of the next hop, followed by an operation 425 to store the MTU size in the portion of the packet reserved for PMTU size, and an operation 430 to forward the packet to the next hop. Responsive to not identifying the RC flag being set to identify that the portion of the packet is reserved for PMTU size and not identifying the PMTU bit being set to positive, an operation 450 is executed by the error generation and transmission module 150 to generate an error message, followed by an operation 455 to transmit the error message including the MTU size to the source node, and an operation 460 to resend the packet by the source node after reducing the packet size to the MTU size.

It shall be noted that aspects of the present patent document may be directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, router, switch, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 5:
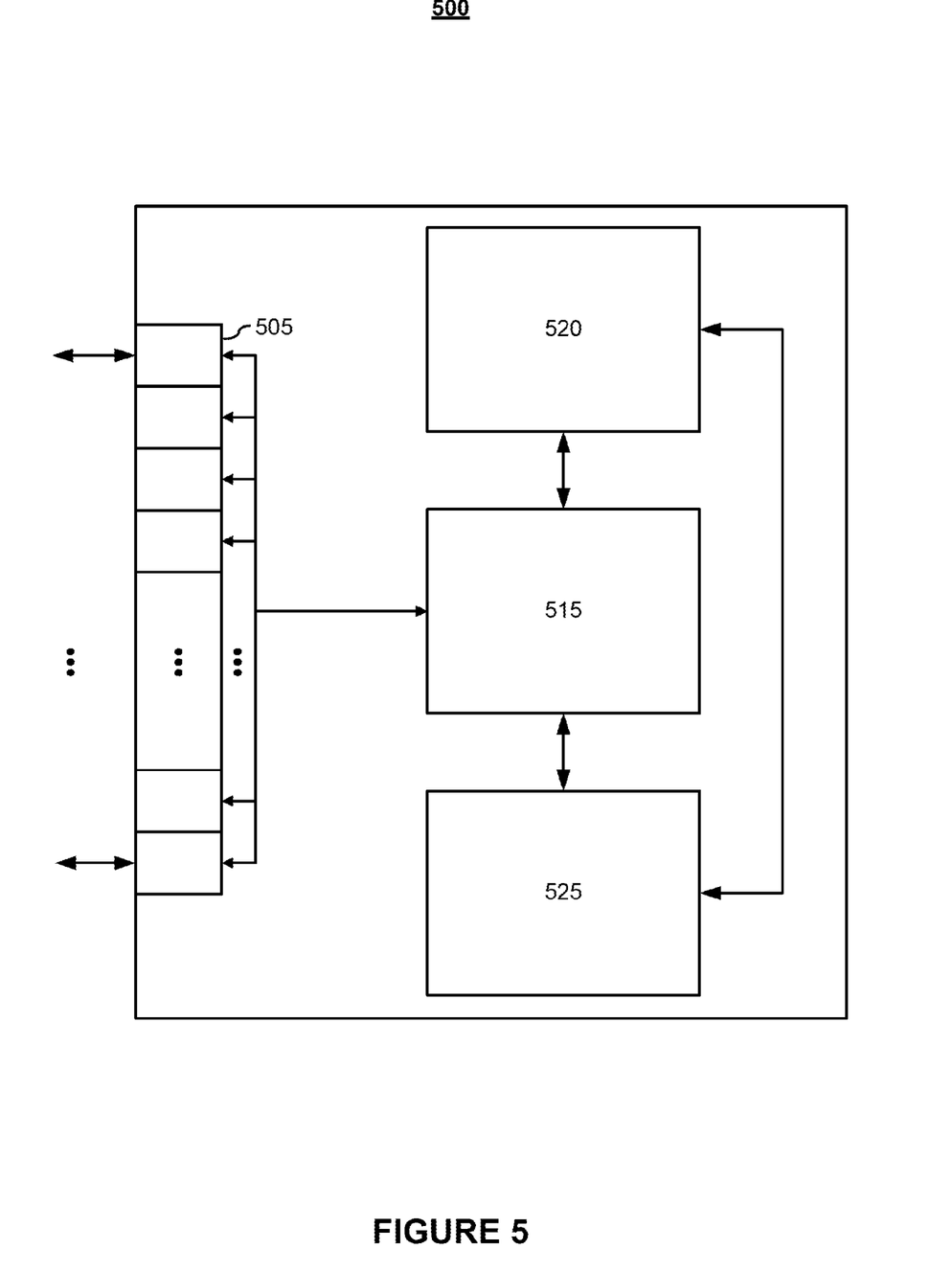
FIG. 5 depicts a block diagram of an exemplary information handling system node according to embodiments of the present invention.

FIG. 5 depicts a block diagram of an exemplary information handling system node according to embodiments of the present invention. It will be understood that the functionalities shown for switch 500 may operate to support various embodiments of the present invention—although it shall be understood that a node may be differently configured and include different components. The node 500 may include a plurality of I/O ports 505, a data processing and fabric component 515, tables 520, and a switch control functionality portion 525. In embodiments, the I/O ports 505 are connected to one or more nodes. The data processing functionality 515 may use information included in the network data received at the node 500, as well as information stored in the tables 520, to identify a next hop for the network data, among other possible activities. In embodiments, the switching fabric then schedules the network data for propagation through the node to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A method for path maximum transmission unit (PMTU) discovery of a network path in a network, the method comprising:
    responsive to receiving a packet at a node along a network path between a source node and a destination node;
        comparing a maximum transmit unit (MTU) size of a next hop along the network path with the size of the packet; and
        responsive to the MTU size of the next hop along the network path being less than the size of the packet and identifying a "do not fragment" (DF) flag being set to not allow fragmentation:
            responsive to identifying a recycled (RC) flag being set to identify that a portion of the packet is reserved for PMTU size, and a PMTU bit being set to positive:
                truncating the packet to the MTU size of the next hop;
                storing the MTU size in the portion of the packet reserved for PMTU size; and
                forwarding the packet to the next hop; and
    responsive to receiving a packet at a destination node in the network path:
        generating a reply packet by copying the packet and changing a source address and a destination address and transmitting the reply packet to the source node.

2. The method of claim 1, wherein the portion of the packet that is reserved for PMTU size is in an Identification (ID) field of an IPv4 header.

3. The method of claim 2, wherein the PMTU bit is in an Identification (ID) field of an IPv4 header.

4. The method of claim 1, wherein the RC flag is in a control flags field of an IP flags field of an IPv4 header.

5. The method of claim 1, further comprising:
    responsive to not identifying the RC flag being set to identify that the portion of the packet is reserved for PMTU size and not identifying the PMTU bit being set to positive:
        generating an error message; and
        transmitting the error message including the MTU size to the source node.

6. The method of claim 5, wherein the error message is an Internet Control Message Protocol (ICMP) error message of IPv4.

7. The method of claim 1, wherein the packet is an Internet Control Message Protocol (ICMP) packet of IPv4.

8. A method for path maximum transmission unit (PMTU) discovery of a network path between a source node and a destination node in a network, the method comprising:
    identifying in an Internet Control Message Protocol (ICMP) packet that the ICMP packet can be used to support PMTU discovery;
    responsive to a node along the network path identifying that the ICMP packet supports MTU size discovery:
        performing PMTU discovery without requiring an error packet being sent to the source node if a next hop along the network path has a MTU size less than the ICMP packet size; and
        forwarding the ICMP packet.

9. The method of claim 8, wherein the ICMP packet has a "do not fragment" (DF) flag being set to not allow fragmentation, a recycled (RC) flag being set to identify that a portion of the ICMP packet is reserved for PMTU size, and a PMTU bit being set to positive.

10. The method of claim 9, wherein the node is configured to identify that the ICMP packet has the DF flag being set to not allow fragmentation, the RC flag being set to identify that the portion of the ICMP packet is reserved for PMTU size, and the PMTU bit being set to positive.

11. The method of claim 9, wherein the PMTU bit is in an Identification (ID) field of an IPv4 header.

12. The method of claim 9, wherein the RC flag is in a control flags field of an IP Flags field of an IPv4 header.

13. The method of claim 8, wherein the step of performing PMTU discovery comprises:
    truncating the ICMP packet to the MTU size;
    storing the MTU size in a portion of the ICMP packet reserved for PMTU size; and
    forwarding the ICMP packet to a next hop.

14. The method of claim 13, wherein the portion of the ICMP packet that is reserved for PMTU size is in an Identification (ID) field of an IPv4 header.

15. A method for path maximum transmission unit (PMTU) discovery of a network path between a source node and a destination node in a network, the method comprising:
    responsive to a node along the network path that is not the destination node receiving a packet:
        identifying in the packet that the packet can be used to support PMTU discovery; and
        responsive to the node identifying that the packet supports MTU size discovery:
            performing PMTU discovery without requiring an error packet being sent to the source node if a next hop along the network path has a MTU size less than the packet size; and
            forwarding the packet; and
    responsive to the node receiving the packet being the destination node:
        identifying in the packet that the packet can be used to support PMTU discovery; and
        generating a reply packet that includes the MTU size in an Identification (ID) field and transmitting the reply packet to the source node.

16. The method of claim 15, wherein the step of performing PMTU discover comprises:
    truncating the packet to the MTU size;
    storing the MTU size in a portion of the packet reserved for PMTU size; and
    forwarding the packet.

17. The method of claim 15 wherein the packet is a reply packet and the method further comprises:
  responsive to the reply packet being received by a source node:
    examining a PMTU flag and a recycle (RC) flag of the reply packet; and
    responsive to the PMTU flag and the RC flag of the reply being set, retrieving the PMTU data from the reply packet and recording the PMTU data as the PMTU of the network path.

* * * * *